United States Patent
Hiyoshi

(10) Patent No.: US 9,970,524 B2
(45) Date of Patent: May 15, 2018

(54) DRIVING FORCE DISTRIBUTION APPARATUS FOR FOUR-WHEEL DRIVE VEHICLE

(71) Applicant: HONDA MOTOR CO., LTD., Tokyo (JP)

(72) Inventor: Toshio Hiyoshi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 449 days.

(21) Appl. No.: 14/244,899

(22) Filed: Apr. 4, 2014

(65) Prior Publication Data
US 2014/0305116 A1 Oct. 16, 2014

(30) Foreign Application Priority Data

Apr. 12, 2013 (JP) ................................. 2013-084117

(51) Int. Cl.
| | |
|---|---|
| F15B 15/02 | (2006.01) |
| F16H 48/14 | (2006.01) |
| F16H 48/32 | (2012.01) |
| F16H 48/20 | (2012.01) |
| B60K 17/35 | (2006.01) |

(52) U.S. Cl.
CPC .......... *F16H 48/145* (2013.01); *F16H 48/32* (2013.01); *B60K 17/3515* (2013.01); *F16H 2048/204* (2013.01)

(58) Field of Classification Search
CPC ........ B60K 17/02; B60K 17/10; B60K 17/14; B60K 17/105; F25D 25/123; F16D 25/14; F16H 57/04; F16H 61/00

USPC .................................................. 180/233–251
See application file for complete search history.

(56) References Cited

U.S. PATENT DOCUMENTS

| | | | | |
|---|---|---|---|---|
| 5,133,696 A | | 7/1992 | Kobayashi | |
| 5,819,192 A | * | 10/1998 | Wakahara | B60K 23/0808 180/247 |
| 5,908,098 A | * | 6/1999 | Gorman | F16D 25/14 137/625.64 |

(Continued)

FOREIGN PATENT DOCUMENTS

| | | |
|---|---|---|
| JP | 02-261947 | 10/1990 |
| JP | 6-241287 | 8/1994 |

(Continued)

OTHER PUBLICATIONS

Japanese Office Action for corresponding JP Application No. 2013-084117, Aug. 30, 2016 (w/ English machine translation).

*Primary Examiner* — Michael Leslie
*Assistant Examiner* — Richard Drake
(74) *Attorney, Agent, or Firm* — Mori & Ward, LLP

(57) ABSTRACT

A driving force distribution apparatus for a four-wheel drive vehicle includes a hydraulic clutch, a spool, and a working-oil filling member. The spool is in an electromagnetic solenoid valve disposed in a hydraulic supply mechanism. The spool is slidably held in a sleeve and has one end biased by a plunger and the other end biased by a spring disposed in a damper chamber. A working oil is filled into the damper chamber through the working-oil filling member. The working-oil filling member is provided in the sleeve of the electromagnetic solenoid valve at an upper position in a direction of gravitational force above an oil surface of the working oil stored in the hydraulic supply mechanism.

11 Claims, 7 Drawing Sheets

(56) References Cited

U.S. PATENT DOCUMENTS

| | | | | |
|---|---|---|---|---|
| 6,024,200 | A * | 2/2000 | Jang | F15B 13/0402 |
| | | | | 137/625.64 |
| 6,086,513 | A * | 7/2000 | Tominaga | F16H 61/0021 |
| | | | | 477/169 |
| 6,591,958 | B1 * | 7/2003 | Moorman | F16D 25/14 |
| | | | | 192/85.41 |
| 7,104,283 | B2 * | 9/2006 | Ino | F15B 13/0402 |
| | | | | 137/625.65 |
| 7,159,506 | B2 * | 1/2007 | Tokura | F15B 11/028 |
| | | | | 60/329 |
| 7,926,513 | B2 * | 4/2011 | Ishibashi | F15B 13/0407 |
| | | | | 137/625.68 |
| 8,226,526 | B2 * | 7/2012 | Czoykowski | B60K 6/22 |
| | | | | 477/146 |
| 9,151,395 | B2 * | 10/2015 | Sasao | F16K 3/24 |
| 2009/0000677 | A1 * | 1/2009 | Inaguma | F16H 61/0251 |
| | | | | 137/624.27 |
| 2011/0005617 | A1 * | 1/2011 | Hart | F16H 57/0434 |
| | | | | 137/511 |

FOREIGN PATENT DOCUMENTS

| | | |
|---|---|---|
| JP | 2004-84928 | 3/2004 |
| JP | 2009-103219 | 5/2009 |

* cited by examiner

DRIVING FORCE DISTRIBUTION APPARATUS FOR FOUR-WHEEL DRIVE VEHICLE

CROSS-REFERENCE TO RELATED APPLICATIONS

The present application claims priority under 35 U.S.C. § 119 to Japanese Patent Application No. 2013-084117, filed Apr. 12, 2013, entitled "Driving Force Distribution Apparatus for Four-Wheel Drive Vehicle." The contents of this application are incorporated herein by reference in their entirety.

BACKGROUND

1. Field

The present disclosure relates to a driving force distribution apparatus for a four-wheel drive vehicle.

2. Description of the Related Art

As a driving force distribution apparatus for a four-wheel drive vehicle, Japanese Unexamined Patent Application Publication No. 2-261947, for example, discloses an apparatus including a hydraulic clutch disposed in a driving force transmission path that couples a driving force of a driving source mounted in the vehicle to front and rear wheels or to left and right wheels, wherein the driving force of the driving source can be variably distributed to the front and rear wheels or to the left and right wheels after regulating pressure of working oil that is supplied to the hydraulic clutch through an electromagnetic solenoid valve disposed in a hydraulic supply mechanism.

In the above-mentioned apparatus, the electromagnetic solenoid valve disposed in the hydraulic supply mechanism include a spool, which is slidably held in a sleeve and which has one end biased by a plunger and the other end biased by a spring disposed in a damper chamber, and the damper chamber is filled with the working oil to suppress pulsations of the oil pressure. In the technique disclosed in Japanese Unexamined Patent Application Publication No. 2-261947, the electromagnetic solenoid valve including the damper chamber is immersed in the working oil.

SUMMARY

According to one aspect of the present invention, a driving force distribution apparatus for a four-wheel drive vehicle includes a hydraulic clutch, a spool, and a working-oil filling member. The hydraulic clutch is disposed in a driving force transmission path that couples a driving force of a driving source mounted in the vehicle to front and rear wheels or to left and right wheels. The driving force of the driving source is variably distributed to the front and rear wheels or to the left and right wheels by regulating pressure of working oil that is supplied from a hydraulic supply mechanism to the hydraulic clutch through an electromagnetic solenoid valve disposed in the hydraulic supply mechanism. The spool is in the electromagnetic solenoid valve disposed in the hydraulic supply mechanism. The spool is slidably held in a sleeve and has one end biased by a plunger and the other end biased by a spring disposed in a damper chamber. The working oil is filled into the damper chamber through the working-oil filling member. The working-oil filling member is provided in the sleeve of the electromagnetic solenoid valve at an upper position in a direction of gravitational force above an oil surface of the working oil stored in the hydraulic supply mechanism.

According to another aspect of the present invention, a driving force distribution apparatus for a four-wheel drive vehicle includes a hydraulic supply mechanism and a hydraulic clutch. The hydraulic supply mechanism includes an electromagnetic solenoid valve. The electromagnetic solenoid valve includes a sleeve, a spool, a plunger, a spring, and a working-oil filling member. The spool is provided in the sleeve to be slidable in a slide direction and has one end and another end opposite to the one end in the slide direction. The plunger is to push the one end of the spool. The spring is disposed in a damper chamber to push the another end of the spool. A working oil is to be supplied to the damper chamber through the working-oil filling member. The working-oil filling member is provided in the sleeve of the electromagnetic solenoid valve at an upper position in a direction of gravitational force above an oil surface of the working oil stored in the hydraulic supply mechanism. The hydraulic clutch is disposed in a driving force transmission path via which a driving force generated by a driving source mounted in the vehicle is transmitted to front and rear wheels or to left and right wheels. The driving force is variably distributed to the front and rear wheels or to the left and right wheels by regulating pressure of the working oil that is supplied from the hydraulic supply mechanism to the hydraulic clutch through the electromagnetic solenoid valve.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
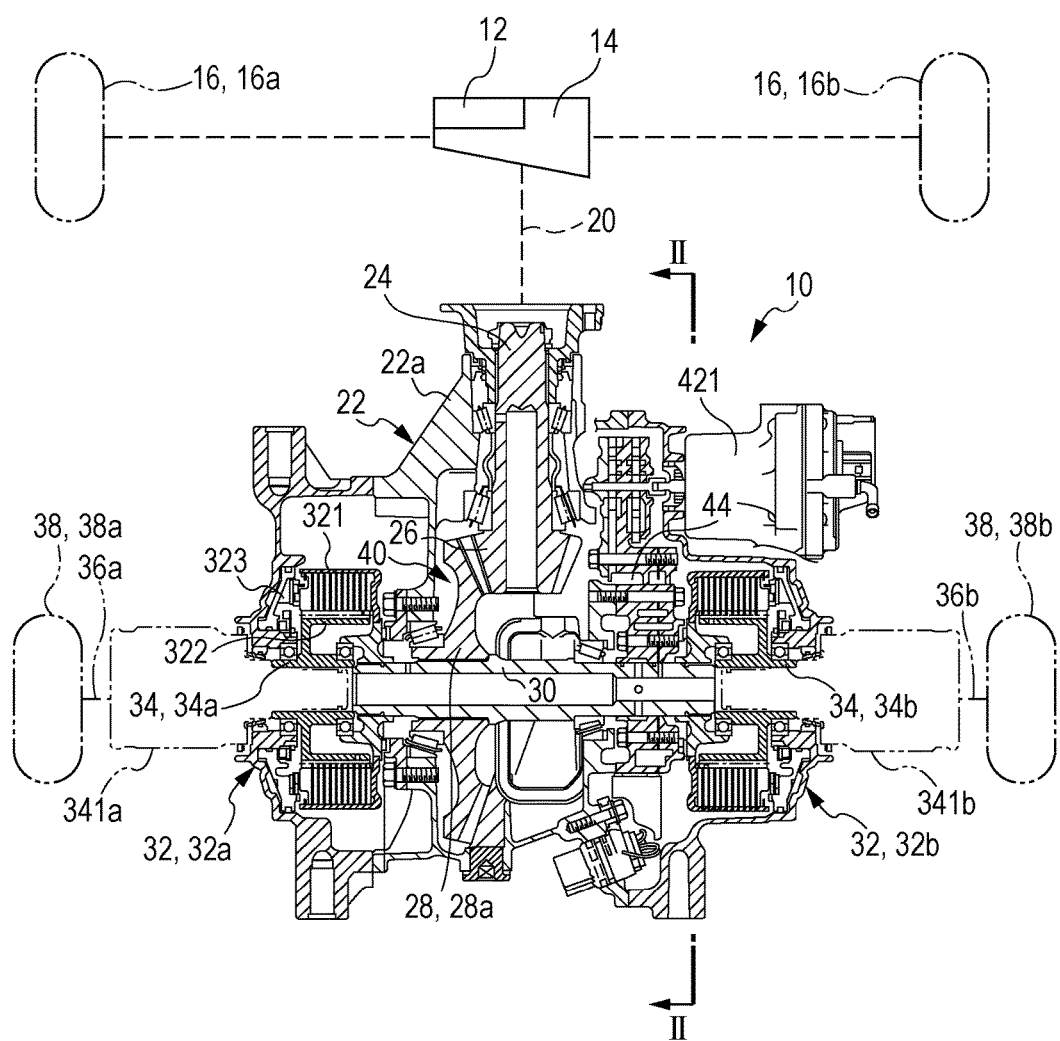
FIG. 1 is a sectional view of a driving force distribution apparatus for a four-wheel drive vehicle according to a first embodiment of the present application.

The embodiments will now be described with reference to the accompanying drawings, wherein like reference numerals designate corresponding or identical elements throughout the various drawings.

Embodiments of a driving force distribution apparatus for a four-wheel drive vehicle according to an embodiment of the present application will be described below with reference to the accompanying drawings.

First Embodiment

Figure 2:
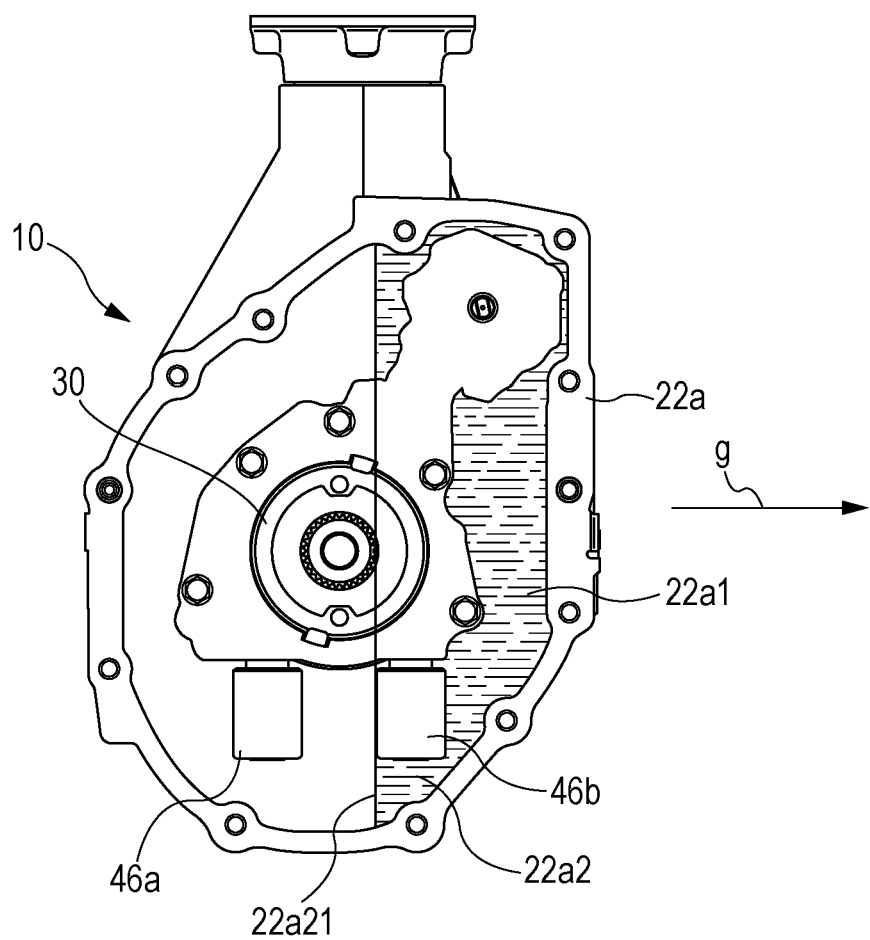
FIG. 2 is a sectional view taken along a line II-II in FIG. 1.
Figure 3:
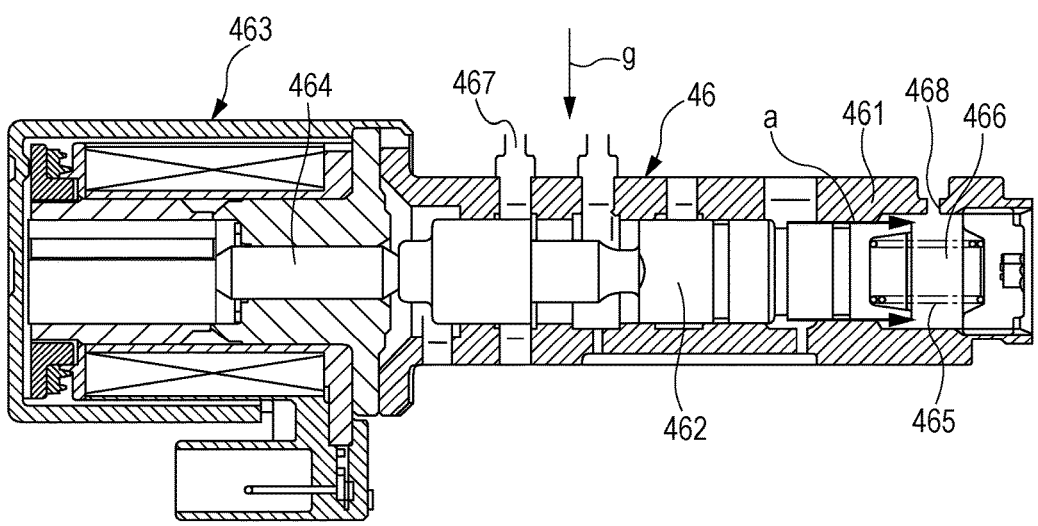
FIG. 3 is an explanatory sectional view of an electromagnetic solenoid valve illustrated in FIG. 2.
Figure 4:
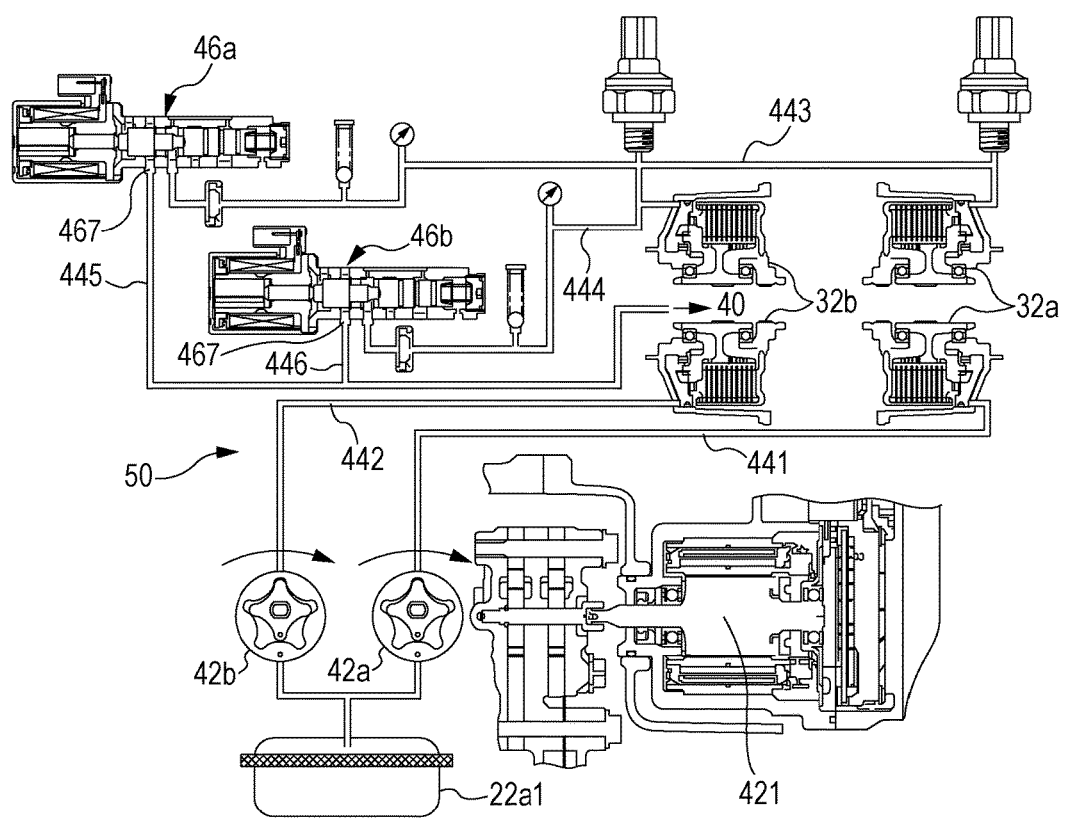
FIG. 4 is a hydraulic circuit diagram of a hydraulic supply mechanism in the driving force distribution apparatus illustrated in FIG. 1.

FIG. 1 is a sectional view of a driving force distribution apparatus for a four-wheel drive vehicle according to a first embodiment of the present application, and FIG. 2 is a sectional view taken along a line II-II in FIG. 1. FIG. 3 is an explanatory sectional view of an electromagnetic solenoid valve illustrated in FIG. 2, and FIG. 4 is a hydraulic circuit diagram of a hydraulic supply mechanism in the driving force distribution apparatus illustrated in FIG. 1.

A driving force distribution apparatus 10 for a four-wheel drive vehicle according to the first embodiment includes a driving source 12 mounted in the vehicle. An output shaft of the driving source 12 is connected to an automatic transmission 14, and a driving force of the driving source 12 is transmitted, after being subjected to control of speed change in the automatic transmission 14, to front wheels 16 (more specifically, left and right front wheels 16a and 16b) through a front differential mechanism (not illustrated).

The output shaft of the driving source 12 is further coupled to a rear differential mechanism 22 of the driving force distribution apparatus 10 from a propeller shaft 20 through the automatic transmission 14 and a transfer (not illustrated).

The driving force distribution apparatus 10 including the rear differential mechanism 22 is accommodated in a rear differential case 22a. The propeller shaft 20 is coupled to a pinion shaft 24, which is rotatably accommodated in the rear differential case 22a, thus rotating a drive bevel gear 26.

The drive bevel gear 26 is coupled to driven bevel gears 28, more specifically to left and right driven bevel gears (only the left driven bevel gear 28a being illustrated). The drive bevel gear 26 and the driven bevel gears 28 are hypoid gears.

The driven bevel gears 28 are fixed through splines to both ends of one clutch drive shaft 30 that is rotatably supported in the rear differential case 22a. The clutch drive shaft 30 is coupled to left and right output shafts 34a and 34b through multi-plate hydraulic clutches (more specifically, left and right hydraulic clutches 32a and 32b).

The left and right output shafts 34a and 34b are coupled to axle shafts 36a and 36b through couplings 341a and 341b, and the axle shafts 36a and 36b are coupled to left and right rear wheels 38a and 38b, respectively.

Because the left and right hydraulic clutches 32a and 32b and the left and right output shafts 34a and 34b have the same structures on the left and right sides, their structures on the left side are described below with omission of suffixes a and b attached to the reference symbols. The hydraulic clutch 32 includes a clutch outer 321 fixed to the clutch drive shaft 30, a clutch inner 322 fixed to the output shaft 34, a piston 323, and so on.

A plurality of clutch disks project from an inner periphery of the clutch outer 321 toward the clutch inner 322, and a plurality of clutch plates, each made of a friction material, project from an outer periphery of the clutch inner 322 toward the clutch outer 321 such that each clutch plate is inserted between the adjacent clutch disks.

In the hydraulic clutch 32, when oil pressure is supplied to the piston 323, the clutch disks and the clutch plates are pressed and engaged with each other, whereby rotation of the clutch drive shaft 30 is transmitted to the output shaft 34.

Thus, a driving force transmission path 40 extending from the propeller shaft 20 to the rear wheel 38 via the pinion shaft 24, the drive and driven bevel gears 26 and 28, the clutch drive shaft 30, the output shaft 34, the coupling 341, and the axle shaft 36 is formed between the driving source 12 and the rear wheel 18.

As illustrated in FIG. 4, two left and right electrically-driven hydraulic pumps 42a and 42b (omitted in FIG. 1) and one control body 44 are disposed near the hydraulic clutch 32. Inside the rear differential case 22a, as illustrated in FIG. 2, working oil (e.g., ATF) 22a2 is stored in a reservoir 22a1 that is located on the lower side in the direction g of gravitational force (when the rear differential case 22a is mounted in the vehicle) (reference symbol 22a21 indicating a surface of the working oil).

The two electrically-driven hydraulic pumps 42 are both coaxially coupled, though not illustrated, to one brushless motor 421 to be driven together. The hydraulic pumps 42 are arranged at positions where they are immersed in the working oil under the oil surface 22a21, to be capable of pumping up and delivering the working oil.

The control body 44 is in the form of a groove or a recess, which constitutes a hydraulic path connecting a delivery port of the electrically-driven hydraulic pump 42 and the reservoir 22a1, and which accommodates an electronic control unit (not illustrated). The working oil delivered from the electrically-driven hydraulic pump 42 is supplied to the hydraulic path of the control body 44.

As illustrated in FIG. 4, electromagnetic solenoid valves 46 (more specifically, two left and right electromagnetic solenoid valves 46a and 46b corresponding to the left and right rear wheels 38a and 38b) are disposed within the control body 44.

Because the two electromagnetic solenoid valves 46a and 46b have the same structure, they are described below using collective reference symbol 46. As clearly illustrated in FIG. 3, the electromagnetic solenoid valve 46 includes a spool 462 slidably held in a sleeve 461 that is inserted in the control body 44.

The spool 462 has one end in contact with a plunger 464 that is moved upon excitation and demagnetization of an electromagnetic solenoid 463 (namely, the spool 462 is biased toward the other end side when the plunger 464 projects), and the other end in contact with a spring 465 such that the spool 462 is biased by the spring 465 toward the one end side.

In the electromagnetic solenoid valve 46, the spring 465 is disposed in a damper chamber 466. The damper chamber 466 is filled with the working oil to suppress pulsations of the working oil that flows through the oil path of the control body 44.

In this embodiment, a hydraulic supply mechanism 50 is constituted by the electrically-driven hydraulic pump 42, the control body 44, the electromagnetic solenoid valve 46, and so on.

Referring to FIG. 4, the working oil pumped up from the reservoir 22a1 by the two hydraulic pumps 42a and 42b is sent to the corresponding hydraulic clutches 32a and 32b through oil paths 441 and 442 that are formed in the control body 44. The working oil coming out from the hydraulic clutches 32a and 32b are sent to the two electromagnetic solenoid valves 46a and 46b, which are disposed on the downstream side, through oil paths 443 and 444, respectively.

When the oil pressure is regulated with the two electromagnetic solenoid valves 46a and 46b that are excited or demagnetized upon supply or cutoff of currents from the electronic control unit accommodated in the control body 44, the spools 462 are moved by the two electromagnetic solenoid valves 46a and 46b and the plates of the hydraulic clutches 32 are brought into a press-contacted or spaced state, thereby distributing the driving force of the driving source 12 between the front wheels 16 and the rear wheels 38 or between the left and right wheels (rear wheels 38a and 38b) in a known manner.

The two electromagnetic solenoid valves 46a and 46b have respective drain ports 467. The working oil drained from the drain ports 467 after being subjected to the pressure regulation for the hydraulic clutches 32 is sent as a lubricant to the driving force transmission path 40 through lubricant paths 445 and 446.

In this embodiment, as illustrated in FIG. 2, one of the left and right electromagnetic solenoid valves 46a and 46b, more specifically the electromagnetic solenoid valve 46a for the left rear wheel 38a, is disposed in air above the oil surface 22a21 in the direction g of gravitational force (when mounted in the vehicle) (while the other electromagnetic solenoid valve 46b is disposed in the oil).

Thus, there is a possibility that, as denoted by arrows a in FIG. 3, the working oil may leak through a gap between the sleeve 461 and the spool 462, and it may take a time for the damper chamber 466 to be refilled with the working oil, thus causing pulsations in the oil pressure.

To cope with the above-mentioned problem, as illustrated in FIG. 3, this embodiment includes a working-oil filling member, through which the working oil can be filled into the damper chamber 466, in the sleeve 461 of the electromagnetic solenoid valve 46 at an upper position (when mounted in the vehicle) in the direction g of gravitational force above the oil surface 22a21 of the working oil stored in the hydraulic supply mechanism 50, more specifically in the rear differential case 22a accommodating the hydraulic supply mechanism 50. In practice, the working-oil filling member is constituted as a through-hole 468 that is formed in the sleeve 461 at the upper position in the direction g of gravitational force and that is communicated with the damper chamber 466. The through-hole 468 is formed in a state opened to the atmosphere.

Figure 5:
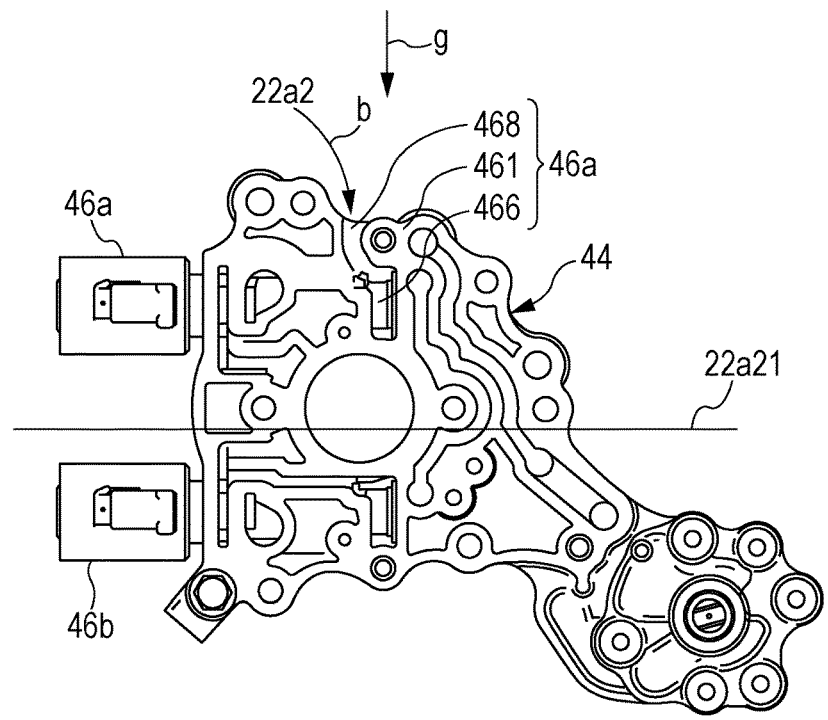
FIG. 5 is an explanatory plan view illustrating a control body (constituting a part of the hydraulic supply mechanism) in a state where a hydraulic clutch is removed from the driving force distribution apparatus illustrated in FIG. 1.

As seen from FIGS. 1 and 2, because the electromagnetic solenoid valve 46 is disposed near the hydraulic clutch 32, the working oil 22a2 picked up by the rotating hydraulic clutch 32 can be filled into the damper chamber 466 via the through-hole 468 as denoted by an arrow b in FIG. 5.

As a result, even when the electromagnetic solenoid valve 46a for regulating the pressure of the working oil supplied to the hydraulic clutch 32 is arranged in air, the damper chamber 466 can be reliably filled with the working oil. Moreover, since the working oil can be filled into the damper chamber 466 via the through-hole 468, the damper chamber 466 can be more reliably filled with the working oil.

Second Embodiment

Figure 6:
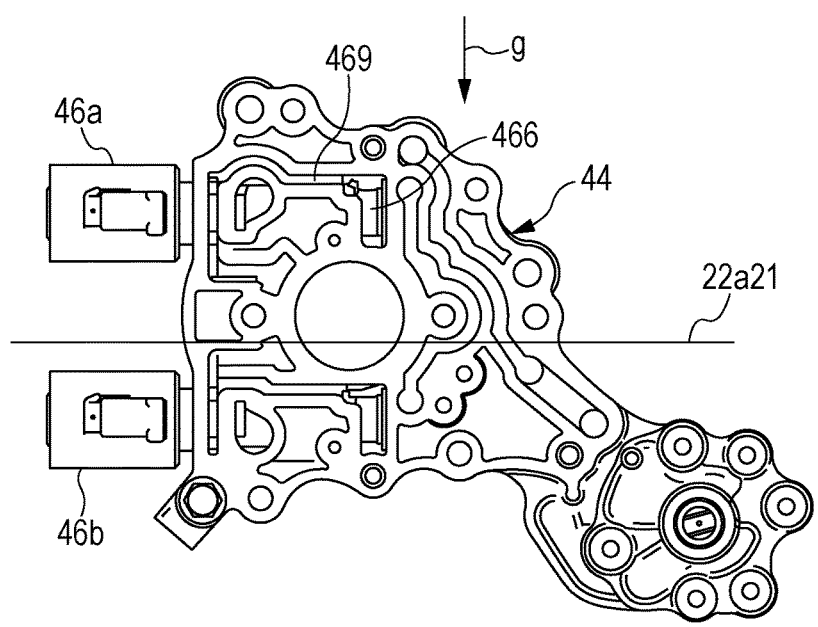
FIG. 6 is an explanatory plan view, similar to that illustrated in FIG. 5, illustrating a control body in a driving force distribution apparatus for a four-wheel drive vehicle according to a second embodiment of the present application.
Figure 7:
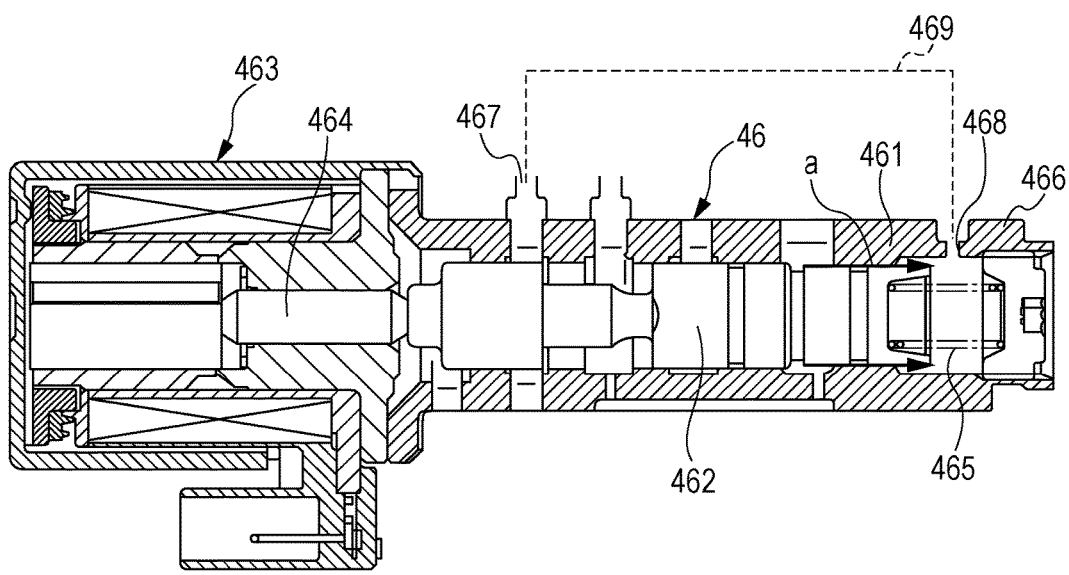
FIG. 7 is an explanatory sectional view of an electromagnetic solenoid valve used in the driving force distribution apparatus according to the second embodiment.
Figure 8:
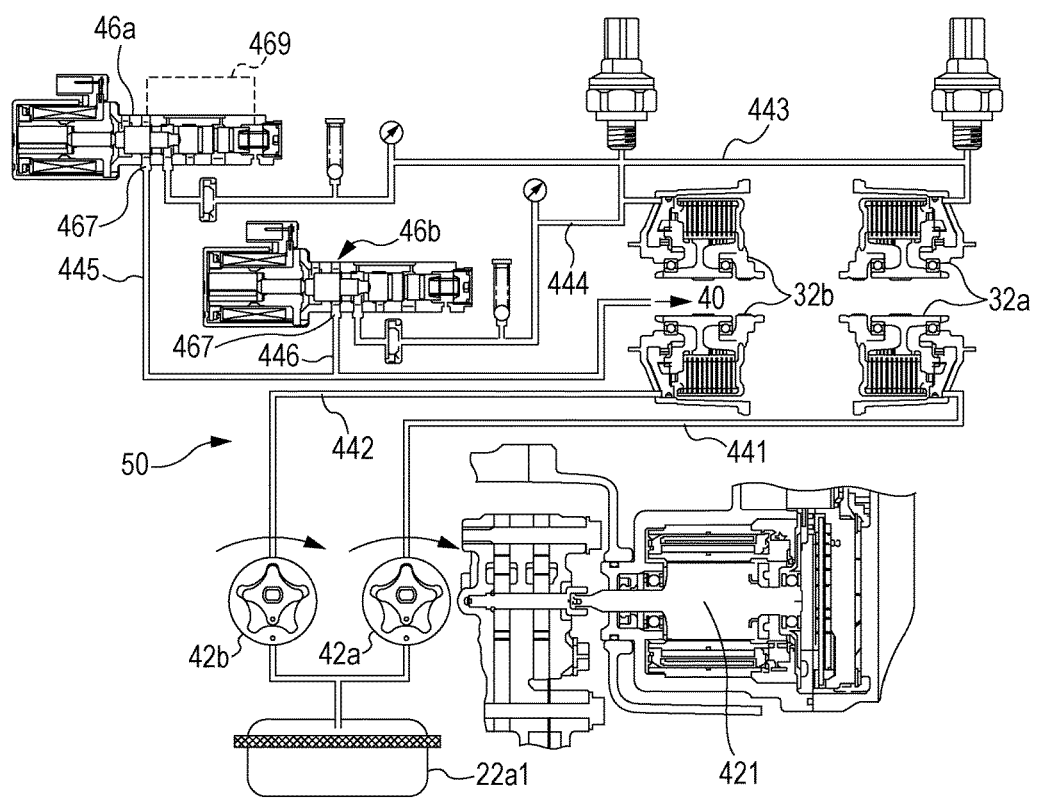
FIG. 8 is a hydraulic circuit diagram of a hydraulic supply mechanism in the driving force distribution apparatus according to the second embodiment.

FIG. 6 is an explanatory plan view, similar to that illustrated in FIG. 5, illustrating a control body in a driving force distribution apparatus for a four-wheel drive vehicle according to a second embodiment of the present application, FIG. 7 is an explanatory sectional view of an electromagnetic solenoid valve illustrated in FIG. 6, and FIG. 8 is a hydraulic circuit diagram of a hydraulic supply mechanism in the driving force distribution apparatus according to the second embodiment.

The second embodiment is described below mainly about a point different from the first embodiment. In the driving force distribution apparatus 10 for the four-wheel drive vehicle according to the second embodiment, the hydraulic supply mechanism 50 includes lubricant paths 445 and 446 through which the working oil after being subjected to the oil pressure regulation is supplied as a lubricant to the driving force transmission path 40 from respective drain ports 467 of the electromagnetic solenoid valves 46a. Moreover, the working-oil filling member is constituted as a branch oil path 469, which is branched from the lubricant path 445 and which connects the drain port 467 of the electromagnetic solenoid valve 46a to the damper chamber 466.

According to the second embodiment constituted as described above, the damper chamber 466 can be more reliably filled with the working oil. It is to be noted that the other structure of the second embodiment is the same as in the first embodiment.

According to the first and second embodiments, as described above, the driving force distribution apparatus 10 for the four-wheel drive vehicle includes the hydraulic clutch 32 disposed in the driving force transmission path 40 that couples the driving force of the driving source 12 mounted in the vehicle to the front and rear wheels 16 and 38 or to the left and right wheels 38a and 38b, the driving force of the driving source being variably distributed to the front and rear wheels or to the left and right wheels by regulating the pressure of the working oil 22a2 that is supplied from the hydraulic supply mechanism 50 to the hydraulic clutch 32 through the electromagnetic solenoid valve 46 disposed in the hydraulic supply mechanism 50. The electromagnetic solenoid valve 46 disposed in the hydraulic supply mechanism 50 includes the spool 462 slidably held in the sleeve 461 and having one end biased by the plunger 464 and the other end biased by the spring 465 disposed in the damper chamber 466. In the driving force distribution apparatus 10, the working-oil filling member (468, 469) through which the working oil can be filled into the damper chamber 466 is provided in the sleeve 461 of the electromagnetic solenoid valve 46 at the upper position in the direction g of gravitational force above the oil surface 22a21 of the working oil stored in the hydraulic supply mechanism 50, more specifically in the rear differential case 22a accommodating the hydraulic supply mechanism 50. Therefore, the damper chamber 466 can be reliably filled with the working oil even when the electromagnetic solenoid valve 46a for regulating the pressure of the working oil supplied to the hydraulic clutch 32 is arranged in air.

Furthermore, since the electromagnetic solenoid valve 46a is disposed near the hydraulic clutch 32 and the working-oil filling member is constituted as the through-hole 468 that is formed in the sleeve 461 at the above-mentioned upper position and that is communicated with the damper chamber 466, the working oil picked up by the hydraulic clutch 32 can be filled into the damper chamber 466 via the through-hole 468. Therefore, even when the electromagnetic solenoid valve 46a for regulating the pressure of the working oil supplied to the hydraulic clutch 32 is arranged in air, the damper chamber 466 can be more reliably filled with the working oil.

Moreover, since the hydraulic supply mechanism 50 includes the lubricant paths 445 and 446 through which the working oil after being subjected to the oil pressure regulation is supplied as a lubricant to the driving force transmission path 40 from the respective drain ports 467 of the electromagnetic solenoid valves 46a and the working-oil filling member is constituted as the branch oil path 469 connecting the drain port 467 of the electromagnetic solenoid valve 46a to the damper chamber 466, the damper chamber 466 can be more reliably filled with the working oil as in the above-mentioned case even when the electromagnetic solenoid valve 46a for regulating the pressure of the working oil supplied to the hydraulic clutch 32 is arranged in air.

It is to be noted that the driving source 12 used in the above-described embodiments may be an internal combustion engine, an electric motor, or a hybrid unit including both an internal combustion engine and an electric motor, and that the automatic transmission 14 may be of any suitable type regardless of being stepwisely or continuously changed in speed insofar as the automatic transmission 14 can control speed change for the output of the driving source 12.

According to a first aspect of the embodiment, there is provided a driving force distribution apparatus for a four-wheel drive vehicle, the driving force distribution apparatus including a hydraulic clutch disposed in a driving force transmission path that couples a driving force of a driving source mounted in the vehicle to front and rear wheels or to left and right wheels, the driving force of the driving source being variably distributed to the front and rear wheels or to the left and right wheels by regulating pressure of working oil that is supplied from a hydraulic supply mechanism to the hydraulic clutch through an electromagnetic solenoid valve disposed in the hydraulic supply mechanism, a spool in the electromagnetic solenoid valve disposed in the hydraulic supply mechanism, the spool being slidably held in a sleeve and having one end biased by a plunger and the other end biased by a spring disposed in a damper chamber, a working-oil filling member through which the working oil is filled into the damper chamber, the working-oil filling member being provided in the sleeve of the electromagnetic solenoid valve at an upper position in a direction of gravitational force above an oil surface of the working oil stored in the hydraulic supply mechanism. With those features, the damper chamber can be reliably filled with the working oil even when the electromagnetic solenoid valve for regulating the pressure of the working oil supplied to the hydraulic clutch is arranged in air.

In the above-described driving force distribution apparatus for the four-wheel drive vehicle according to a second aspect of the embodiment, preferably, the electromagnetic solenoid valve is disposed near the hydraulic clutch, and the working-oil filling member is constituted as a through-hole formed in the sleeve at the aforementioned upper position and communicated with the damper chamber such that the working oil picked up by the hydraulic clutch is filled into the damper chamber via the through-hole. With those features, the damper chamber can be more reliably filled with the working oil even when the electromagnetic solenoid valve for regulating the pressure of the working oil supplied to the hydraulic clutch is arranged in air.

In the driving force distribution apparatus for the four-wheel drive vehicle according to a third aspect of the embodiment, preferably, the hydraulic supply mechanism includes a lubricant path through which the working oil after being subjected to the oil pressure regulation is supplied as a lubricant to the driving force transmission path from a drain port of the electromagnetic solenoid valve, and the working-oil filling member is constituted as a branch oil path connecting the drain port of the electromagnetic solenoid valve to the damper chamber. With those features, the damper chamber can be more reliably filled with the working oil as in the above case even when the electromagnetic solenoid valve for regulating the pressure of the working oil supplied to the hydraulic clutch is arranged in air.

Obviously, numerous modifications and variations of the present invention are possible in light of the above teachings. It is therefore to be understood that within the scope of the appended claims, the invention may be practiced otherwise than as specifically described herein.

What is claimed is:

1. A driving force distribution apparatus for a four-wheel drive vehicle, the driving force distribution apparatus comprising:
   a hydraulic clutch disposed in a driving force transmission path that couples a driving force of a driving source mounted in the vehicle to front and rear wheels or to left and right wheels, the driving force of the driving source being variably distributed to the front and rear wheels or to the left and right wheels by regulating pressure of working oil that is supplied from a hydraulic supply mechanism to the hydraulic clutch through an electromagnetic solenoid valve disposed in the hydraulic supply mechanism;
   a spool in the electromagnetic solenoid valve disposed in the hydraulic supply mechanism, the spool being slidably held in a sleeve and having one end biased by a plunger and the other end biased by a spring disposed in a damper chamber; and
   a working-oil filling member through which the working oil is filled into the damper chamber, the working-oil filling member being provided in the sleeve of the electromagnetic solenoid valve at an upper position in relation to gravitational force, the working-oil filling member being entirely located above an oil surface of the working oil stored in the hydraulic supply mechanism in relation to a direction of the gravitational force,
   wherein the working-oil filling member is constituted as a through-hole formed in communication with the damper chamber,
   wherein the through-hole is provided in a state opened to atmosphere when the driving force distribution apparatus is in an operational state, and
   wherein the electromagnetic solenoid valve and the hydraulic clutch are disposed in a same case and are adjacent to each other, and the through-hole is formed in the sleeve at the aforementioned upper position and communicated with the damper chamber, such that the working oil picked up by the hydraulic clutch is filled into the damper chamber via the through-hole that is in the state opened to the atmosphere.

2. The driving force distribution apparatus according to claim 1, wherein the hydraulic supply mechanism includes a lubricant path through which the working oil after being subjected to the oil pressure regulation is supplied as a lubricant to the driving force transmission path from a drain port of the electromagnetic solenoid valve, and the working-oil filling member is constituted as a branch oil path connecting the drain port of the electromagnetic solenoid valve to the damper chamber.

3. A driving force distribution apparatus for a four-wheel drive vehicle, comprising:
   a hydraulic supply mechanism comprising an electromagnetic solenoid valve comprising:
      a sleeve;
      a spool provided in the sleeve to be slidable in a slide direction and having one end and another end opposite to the one end in the slide direction;
      a plunger to push the one end of the spool;
      a spring disposed in a damper chamber to push the another end of the spool; and
      a working-oil filling member through which a working oil is to be supplied to the damper chamber, the working-oil filling member being provided in the sleeve of the electromagnetic solenoid valve at an upper position in relation to gravitational force, the working-oil filling member being entirely located above an oil surface of the working oil stored in the hydraulic supply mechanism in relation to a direction of the gravitational force; and a hydraulic clutch disposed in a driving force transmission path via which a driving force generated by a driving source mounted in the vehicle is transmitted to front and rear wheels or to left and right wheels, the driving force being variably distributed to the front and rear wheels or to the left and right wheels by regulating pressure of the working oil that is supplied from the hydraulic supply mechanism to the hydraulic clutch through the electromagnetic solenoid valve, wherein the working-oil filling member is constituted as a through-hole formed in communication with the damper chamber, wherein the through-hole is provided in a state opened to atmosphere when the driving force distribution apparatus is in an operational state, and wherein the electromagnetic solenoid valve and the hydraulic clutch are disposed in a same case and are adjacent to each other, and the through-hole is provided in the sleeve at the upper position and communicated with the damper chamber, such that the working oil picked up by the hydraulic clutch is supplied into the damper chamber via the through-hole that is in the state opened to the atmosphere.

4. The driving force distribution apparatus according to claim 3, wherein the hydraulic supply mechanism includes a lubricant path through which the working oil after being subjected to an oil pressure regulation is supplied as a lubricant to the driving force transmission path from a drain port of the electromagnetic solenoid valve, and the working-oil filling member is constituted as a branch oil path connecting the drain port of the electromagnetic solenoid valve to the damper chamber.

5. The driving force distribution apparatus according to claim 3,
wherein the through-hole is provided over the damper chamber in the sleeve.

6. The driving force distribution apparatus according to claim 1,
wherein the through-hole is formed in a top of the sleeve in relation to the gravitational force.

7. The driving force distribution apparatus according to claim 1,
wherein the through-hole is formed in an uppermost position of the sleeve in relation to the gravitational force.

8. The driving force distribution apparatus according to claim 3,
wherein the through-hole is formed in a top of the sleeve in relation to the gravitational force.

9. The driving force distribution apparatus according to claim 3,
wherein the through-hole is formed in an uppermost position of the sleeve in relation to the gravitational force.

10. The driving force distribution apparatus according to claim 1,
wherein the hydraulic clutch includes a clutch outer fixed to a clutch drive shaft,
wherein the clutch drive shaft extends along an axis, and
wherein the electromagnetic solenoid valve is mounted at a location that overlaps with the clutch outer when viewed in a direction along the axis of the clutch drive shaft.

11. The driving force distribution apparatus according to claim 3,
wherein the hydraulic clutch includes a clutch outer fixed to a clutch drive shaft,
wherein the clutch drive shaft extends along an axis, and
wherein the electromagnetic solenoid valve is mounted at a location that overlaps with the clutch outer when viewed in a direction along the axis of the clutch drive shaft.

* * * * *